(12) United States Patent
Hart et al.

(10) Patent No.: US 7,983,151 B2
(45) Date of Patent: Jul. 19, 2011

(54) COMMUNICATION SYSTEMS

(75) Inventors: Michael John Beems Hart, London (GB); Yuefeng Zhou, Oxshott (GB); Sunil Keshavji Vadgama, Middlesex (GB)

(73) Assignee: Fujitsu Limited, Kawasaki (JP)

( * ) Notice: Subject to any disclaimer, the term of this patent is extended or adjusted under 35 U.S.C. 154(b) by 61 days.

(21) Appl. No.: 12/226,659

(22) PCT Filed: Jul. 31, 2007

(86) PCT No.: PCT/GB2007/002898
§ 371 (c)(1),
(2), (4) Date: Jan. 29, 2009

(87) PCT Pub. No.: WO2008/040930
PCT Pub. Date: Apr. 10, 2008

(65) Prior Publication Data
US 2009/0185479 A1    Jul. 23, 2009

(30) Foreign Application Priority Data

Oct. 2, 2006 (GB) .................................. 0619455.9

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/28 | (2006.01) |
| H04H 20/71 | (2008.01) |

(52) U.S. Cl. .................. 370/218; 370/254; 370/312

(58) Field of Classification Search .................. None
See application file for complete search history.

(56) References Cited

U.S. PATENT DOCUMENTS 5,805,203 A * 9/1998 Horton .......................... 725/119
(Continued)

FOREIGN PATENT DOCUMENTS

CA    2556681 A1    9/2004
(Continued)

OTHER PUBLICATIONS

IEEE 802.11g Standard Part 11: Wireless LAN Medium Access Control (MAC) and Physical Layer (PHY) specifications Amendment 4: Further Higher Data Rate Extension in the 2.4 GHz Band; dated Jun. 23, 2003.

(Continued)

Primary Examiner — Xavier Szewai Wong
(74) Attorney, Agent, or Firm — Murphy & King, PC (57) ABSTRACT

An uplink transmission method for use in a multi-hop communication system, the system comprising a mobile station (MS), a base station (BS) and one or more relay stations (RS), and the system providing two or more different communication paths extending between the mobile station and the base station, the mobile station being operable to transmit information indirectly to the base station along a series of links forming a first such communication path via one or more of the relay stations and also being operable to transmit information to the base station along one link or a series of links forming a second such communication path; the method comprising transmitting particular information from the mobile station along the first and the second communication paths; and combining the same particular information transmitted along the first and second communication paths in the base station.

20 Claims, 6 Drawing Sheets

Basic procedure of BS HARQ operations in relay enabled networks

U.S. PATENT DOCUMENTS

| | | | |
|---|---|---|---|
| 6,965,568 B1 * | 11/2005 | Larsen | 370/238 |
| 2002/0115409 A1 | 8/2002 | Khayrallah | |
| 2004/0095920 A1 | 5/2004 | Lippman | |
| 2005/0122898 A1 * | 6/2005 | Jang et al. | 370/218 |
| 2005/0249162 A1 * | 11/2005 | Kim et al. | 370/333 |
| 2005/0272366 A1 * | 12/2005 | Eichinger et al. | 455/9 |
| 2008/0049718 A1 * | 2/2008 | Chindapol et al. | 370/351 |
| 2008/0075007 A1 * | 3/2008 | Mehta et al. | 370/238 |
| 2009/0268662 A1 * | 10/2009 | Larsson et al. | 370/328 |

FOREIGN PATENT DOCUMENTS

| | | |
|---|---|---|
| EP | 1843488 A1 | 8/2006 |
| EP | 1843488 A | 10/2008 |
| GB | 2440982 | 2/2008 |
| GB | 2440984 | 2/2008 |
| GB | 2440985 | 2/2008 |
| WO | 9836509 | 8/1998 |
| WO | 2005053338 A1 | 6/2005 |
| WO | 2005088914 A1 | 9/2005 |
| WO | 2006090669 | 8/2006 |
| WO | WO 2006/090669 A1 | 8/2006 |

OTHER PUBLICATIONS

IEEE 802.16 2004 "IEEE Standard for Local and Metropolitan Area Networks. Part 16: Air Interface for Fixed Broadband Wireless Access Systems." Dated Oct. 1, 2004.

IEEE St. 802.16e 2005 "IEEE Standard for Local and Metropolitan Area Networks. Part 16: Air Interface for Fixed and Mobile Broadband Wireless Access Systems. Amendment 2: Physical and Medium Access Control Layers for Combined Fixed and Mobile Operation in Licensed Bands." Dated Feb. 28, 2006.

International Search Report and a Written Opinion of the International Searching Authority, in PCT/GB2007/002898 Oct. 18, 2008.

* cited by examiner

*Fig. 1a*

Basic procedure of BS HARQ operations in relay enabled networks

Example TDD frame structure from OFDMA physical layer of the IEEE802.16 standard

COMMUNICATION SYSTEMS

Currently there exists significant interest in the use of multihop techniques in packet based radio and other communication systems, where it is purported that such techniques will enable both extension in coverage range and increase in system capacity (throughput).

Figure 2:
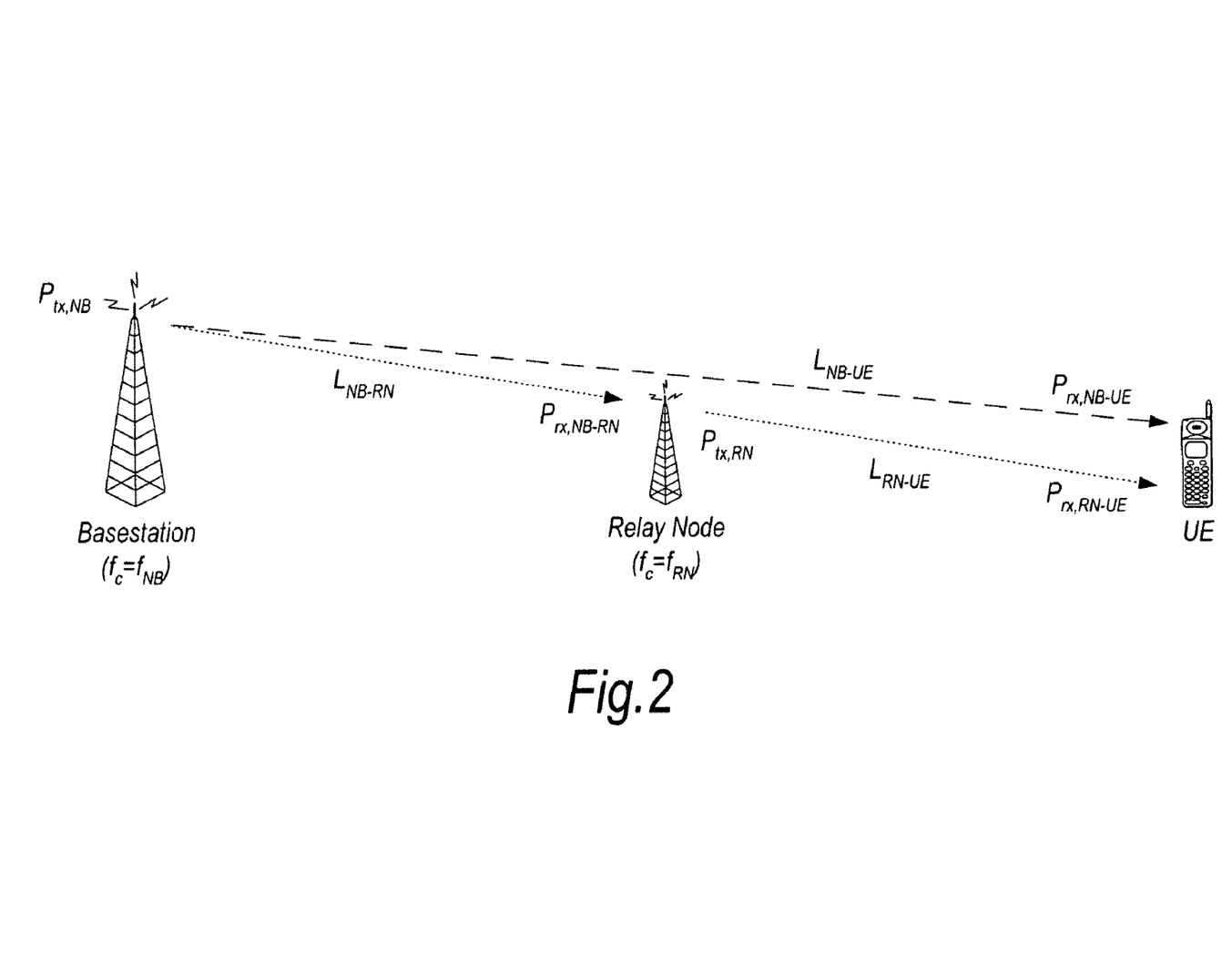
FIG. 2 shows a single-cell two-hop wireless communication system.

In a multi-hop communication system, communication signals are sent in a communication direction along a communication path (C) from a source apparatus to a destination apparatus via one or more intermediate apparatuses. FIG. 2 illustrates a single-cell two-hop wireless communication system comprising a base station BS (known in the context of 3G communication systems as "node-B" NB) a relay node RN (also known as a relay station RS) and a user equipment UE (also known as mobile station MS or user terminal). In the case where signals are being transmitted on the downlink (DL) from a base station to a destination user equipment (UE) via the relay node (RN), the base station comprises the source station (S) and the user equipment comprises the destination station (D). In the case where communication signals are being transmitted on the uplink (UL) from a user equipment (UE), via the relay node, to the base station, the user equipment comprises the source station and the base station comprises the destination station. The relay node is an example of an intermediate apparatus (I) and comprises: a receiver, operable to receive data from the source apparatus; and a transmitter, operable to transmit this data, or a derivative thereof, to the destination apparatus.

Simple analogue repeaters or digital repeaters have been used as relays to improve or provide coverage in dead spots. They can either operate in a different transmission frequency band from the source station to prevent interference between the source transmission and the repeater transmission, or they can operate at a time when there is no transmission from the source station.

Figure 3A:
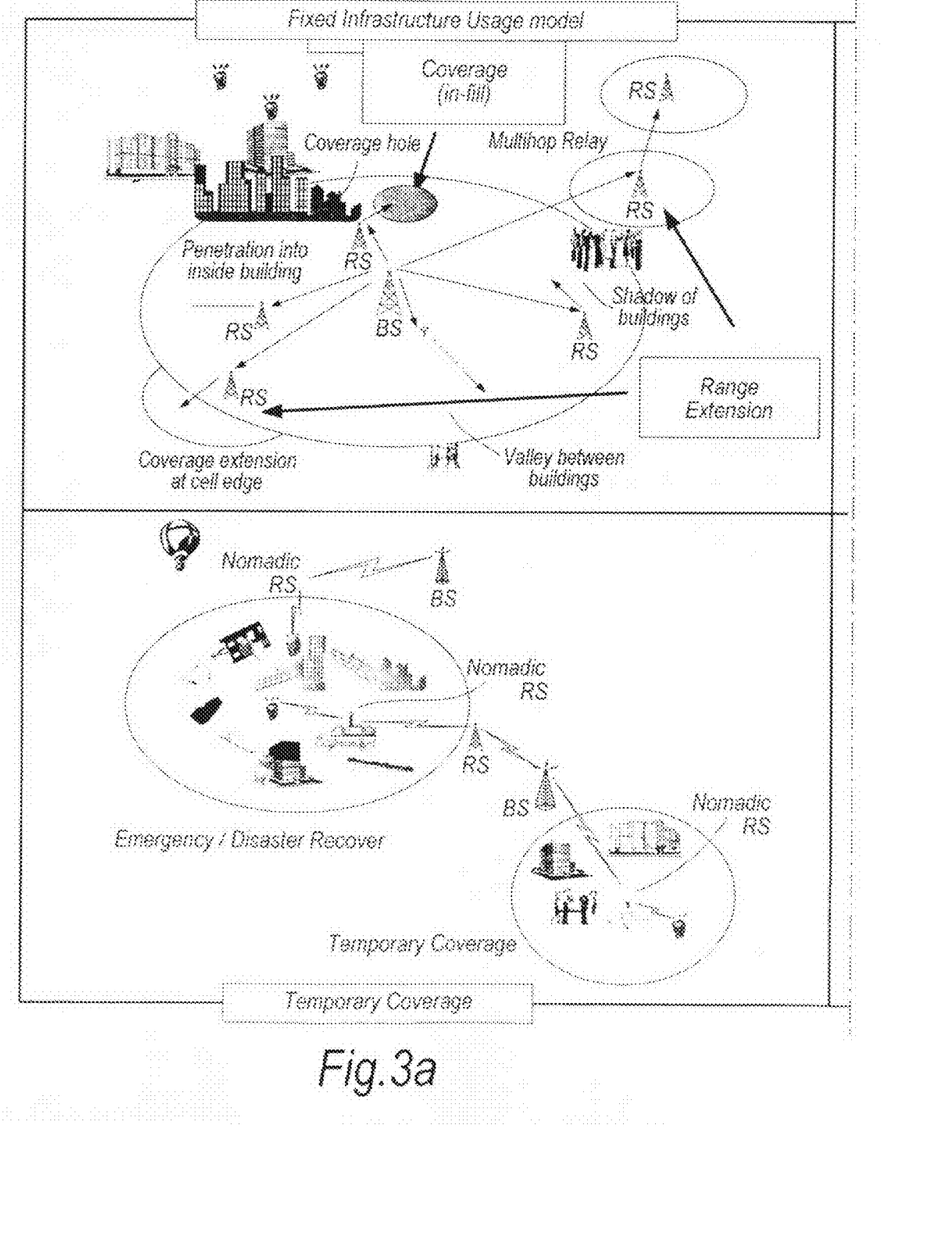
FIG. 3 shows applications of relay stations.
Figure 3B:
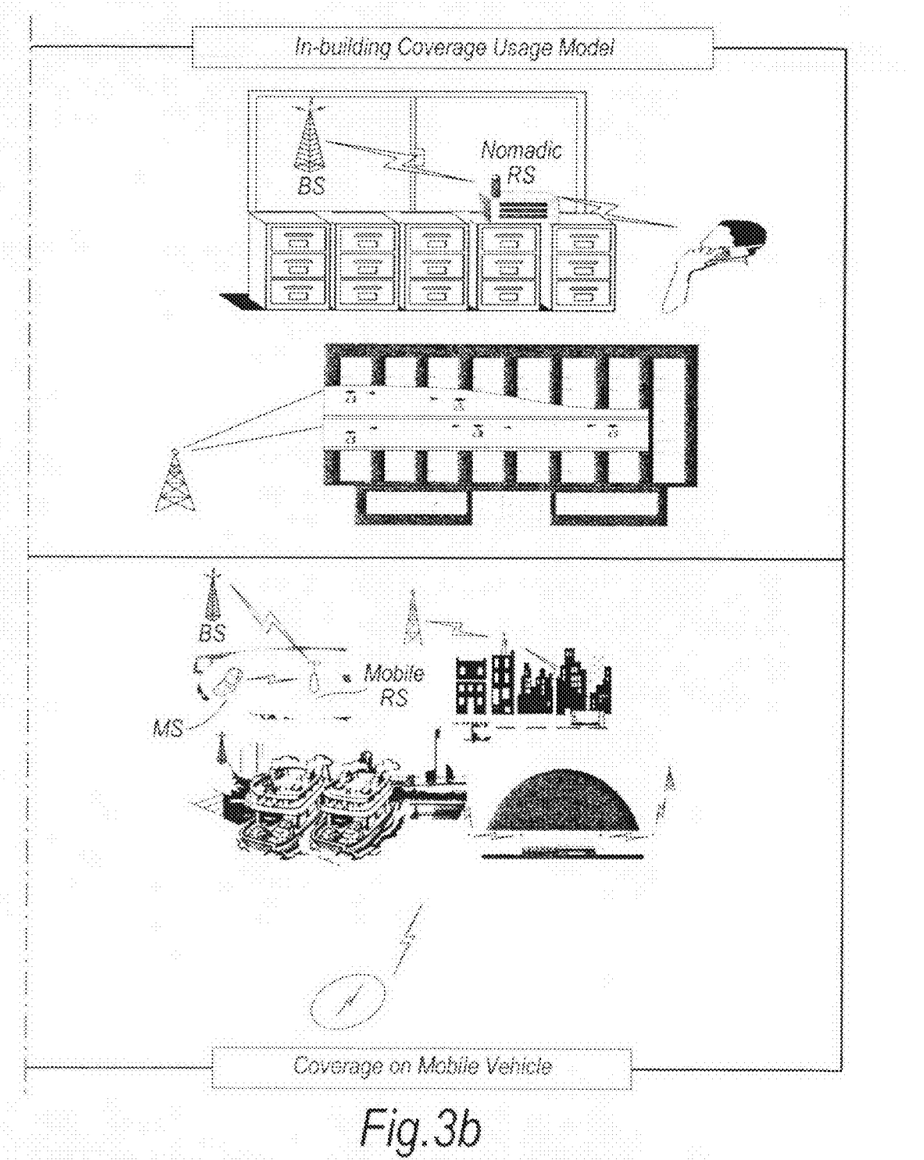

FIG. 3 illustrates a number of applications for relay stations. For fixed infrastructure, the coverage provided by a relay station may be "in-fill" to allow access to the communication network for mobile stations which may otherwise be in the shadow of other objects or otherwise unable to receive a signal of sufficient strength from the base station despite being within the normal range of the base station. "Range extension" is also shown, in which a relay station allows access when a mobile station is outside the normal data transmission range of a base station. One example of in-fill shown at the top right of FIG. 3 is positioning of a nomadic relay station to allow penetration of coverage within a building that could be above, at, or below ground level.

Other applications are nomadic relay stations which are brought into effect for temporary cover, providing access during events or emergencies/disasters. A final application shown in the bottom right of FIG. 3 provides access to a network using a relay positioned on a vehicle.

Relays may also be used in conjunction with advanced transmission techniques to enhance gain of the communications system as explained below.

It is known that the occurrence of propagation loss, or "pathloss", due to the scattering or absorption of a radio communication as it travels through space, causes the strength of a signal to diminish. Factors which influence the pathloss between a transmitter and a receiver include: transmitter antenna height, receiver antenna height, carrier frequency, clutter type (urban, sub-urban, rural), details of morphology such as height, density, separation, terrain type (hilly, flat). The pathloss L (dB) between a transmitter and a receiver can be modelled by:

$$L = b + 10n \log d \quad (A)$$

Where d (metres) is the transmitter-receiver separation, b(db) and n are the pathloss parameters and the absolute pathloss is given by $l=10^{(L/10)}$.

The sum of the absolute path losses experienced over the indirect link SI+ID may be less than the pathloss experienced over the direct link SD. In other words it is possible for:

$$L(SI) + L(ID) < L(SD) \quad (B)$$

Splitting a single transmission link into two shorter transmission segments therefore exploits the non-linear relationship between pathloss verses distance. From a simple theoretical analysis of the pathloss using equation (A), it can be appreciated that a reduction in the overall pathloss (and therefore an improvement, or gain, in signal strength and thus data throughput) can be achieved if a signal is sent from a source apparatus to a destination apparatus via an intermediate apparatus (e.g. relay node), rather than being sent directly from the source apparatus to the destination apparatus. If implemented appropriately, multi-hop communication systems can allow for a reduction in the transmit power of transmitters which facilitate wireless transmissions, leading to a reduction in interference levels as well as decreasing exposure to electromagnetic emissions. Alternatively, the reduction in overall pathloss can be exploited to improve the received signal quality at the receiver without an increase in the overall radiated transmission power required to convey the signal.

Multi-hop systems are suitable for use with multi-carrier transmission. In a multi-carrier transmission system, such as FDM (frequency division multiplex), OFDM (orthogonal frequency division multiplex) or DMT (discrete multi-tone), a single data stream is modulated onto N parallel sub-carriers, each sub-carrier signal having its own frequency range. This allows the total bandwidth (i.e. the amount of data to be sent in a given time interval) to be divided over a plurality of sub-carriers thereby increasing the duration of each data symbol. Since each sub-carrier has a lower information rate, multi-carrier systems benefit from enhanced immunity to channel induced distortion compared with single carrier systems. This is made possible by ensuring that the transmission rate and hence bandwidth of each subcarrier is less than the coherence bandwidth of the channel. As a result, the channel distortion experienced on a signal subcarrier is frequency independent and can hence be corrected by a simple phase and amplitude correction factor. Thus the channel distortion correction entity within a multicarrier receiver can be of significantly lower complexity of its counterpart within a single carrier receiver when the system bandwidth is in excess of the coherence bandwidth of the channel.

Orthogonal frequency division multiplexing (OFDM) is a modulation technique that is based on FDM. An OFDM system uses a plurality of sub-carrier frequencies which are orthogonal in a mathematical sense so that the sub-carriers' spectra may overlap without interference due to the fact they are mutually independent. The orthogonality of OFDM systems removes the need for guard band frequencies and thereby increases the spectral efficiency of the system. OFDM has been proposed and adopted for many wireless systems. It is currently used in Asymmetric Digital Subscriber Line (ADSL) connections, in some wireless LAN applications (such as WiFi devices based on the IEEE802.11a/g standard), and in wireless MAN applications such as WiMAX (based on the IEEE 802.16 standard). OFDM is often used in conjunction with channel coding, an error correction technique, to create coded orthogonal FDM or COFDM. COFDM is now widely used in digital telecommunications systems to improve the performance of an OFDM based system in a multipath environment where variations in the channel distortion can be seen across both sub-carriers in the frequency domain and symbols in the time domain. The system has found use in video and audio broadcasting, such as DVB and DAB, as well as certain types of computer networking technology.

In an OFDM system, a block of N modulated parallel data source signals is mapped to N orthogonal parallel sub-carriers by using an Inverse Discrete or Fast Fourier Transform algorithm (IDFT/IFFT) to form a signal known as an "OFDM symbol" in the time domain at the transmitter. Thus, an "OFDM symbol" is the composite signal of all N sub-carrier signals. An OFDM symbol can be represented mathematically as:

$$x(t) = \frac{1}{\sqrt{N}} \sum_{n=0}^{N-1} c_n \cdot e^{j2\pi n \Delta f t}, \; 0 \le t \le T_s \quad (1)$$

where $\Delta f$ is the sub-carrier separation in Hz, $T_s = 1/\Delta f$ is symbol time interval in seconds, and $c_n$ are the modulated source signals. The sub-carrier vector in (1) onto which each of the source signals is modulated $c \epsilon c_n$, $c=(c_0, c_1 \ldots c_{N-1})$ is a vector of N constellation symbols from a finite constellation. At the receiver, the received time-domain signal is transformed back to frequency domain by applying Discrete Fourier Transform (DFT) or Fast Fourier Transform (FFT) algorithm.

OFDMA (Orthogonal Frequency Division Multiple Access) is a multiple access variant of OFDM. It works by assigning a subset of sub-carriers, to an individual user. This allows simultaneous transmission from several users leading to better spectral efficiency. However, there is still the issue of allowing bi-directional communication, that is, in the uplink and download directions, without interference.

In order to enable bi-directional communication between two nodes, two well known different approaches exist for duplexing the two (forward or download and reverse or uplink) communication links to overcome the physical limitation that a device cannot simultaneously transmit and receive on the same resource medium. The first, frequency division duplexing (FDD), involves operating the two links simultaneously but on different frequency bands by subdividing the transmission medium into two distinct bands, one for forward link and the other for reverse link communications. The second, time division duplexing (TDD), involves operating the two links on the same frequency band, but subdividing the access to the medium in time so that only the forward or the reverse link will be utilizing the medium at any one point in time. Both approaches (TDD & FDD) have their relative merits and are both well used techniques for single hop wired and wireless communication systems. For example the IEEE802.16 standard incorporates both an FDD and TDD mode. IEEE Standard 802.16-2004 "Air Interface for Fixed Broadband Wireless Access Systems" and the 2005 update are hereby incorporated by reference in their entirety.

Figure 4:
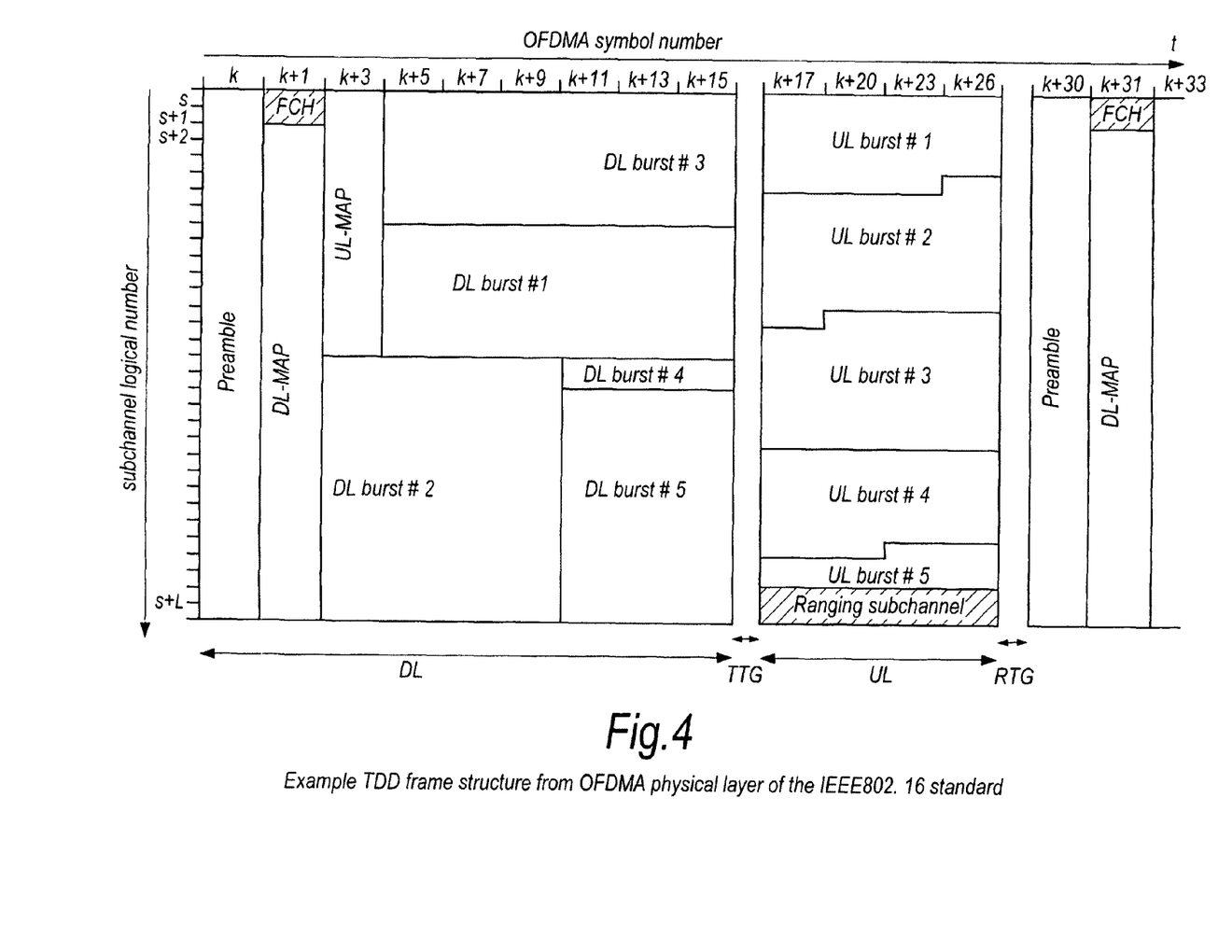
FIG. 4 shows a single hop TDD frame structure used in the OFDMA physical layer mode of the IEEE 802.16 standard.

As an example, FIG. 4 illustrates the single hop TDD frame structure used in the OFDMA physical layer mode of the IEEE802.16 standard (WiMAX).

Each frame is divided into DL and UL subframes, each being a discrete transmission interval. They are separated by Transmit/Receive and Receive/Transmit Transition Guard interval (TTG and RTG respectively). Each DL subframe starts with a preamble followed by the Frame Control Header (FCH), the DL-MAP, and the UL-MAP. The FCH contains the DL Frame Prefix (DLFP) to specify the burst profile and the length of the DL-MAP. The DLFP is a data structure transmitted at the beginning of each frame and contains information regarding the current frame; it is mapped to the FCH.

Simultaneous DL allocations can be broadcast, multicast and unicast and they can also include an allocation for another BS rather than a serving BS. Simultaneous ULs can be data allocations and ranging or bandwidth requests.

The invention is defined in the independent claims, to which reference should now be made. Advantageous embodiments are set out in the sub claims.

In legacy single hop systems (e.g. 802.16-2004 and 802.16e-2005), HARQ is supported in both the up and down-links. HARQ (Hybrid Automatic Repeat ReQuest) is a method of error control, in which there is an automatic retransmission request when an error is detected. HARQ uses an error correction code, which is checked to scan for errors. If errors are found in the code, retransmission is requested.

In practice, the incorrectly received data is usually stored at the receiver and the retransmitted data combined with the old data (chase combining). In a development of chase combining known as incremental redundancy, the initial transmission and any retransmissions are coded differently.

The inventors have come to the surprising realisation that it is possible to use the known chase combining HARQ detection procedure on the BS side, but adapt it for the case of relaying enabled networks where the BS can detect the transmission directly from the MS as well as receive the relayed version of the transmission. Thus, the two transmissions combined are from different paths, rather than one being a retransmission of the other.

Such a situation could arise when the direct link is not sufficient in quality to support direct communication with the BS, or where excessive transmit power would be required from the MS. As a result the main path of communication is via the RS. However, it is possible that the BS can still detect the transmission from the MS. It could also exist where the MS uplink cannot be reliably supported by just one RS or BS so the system attempts to facilitate communication with the MS through relaying the HARQ transmission through one or more RSs.

Preferred features of the present invention will now be described, purely by way of example, with reference to the accompanying drawings, in which: —

MODIFIED "HARQ" OPERATION

Figure 1A:
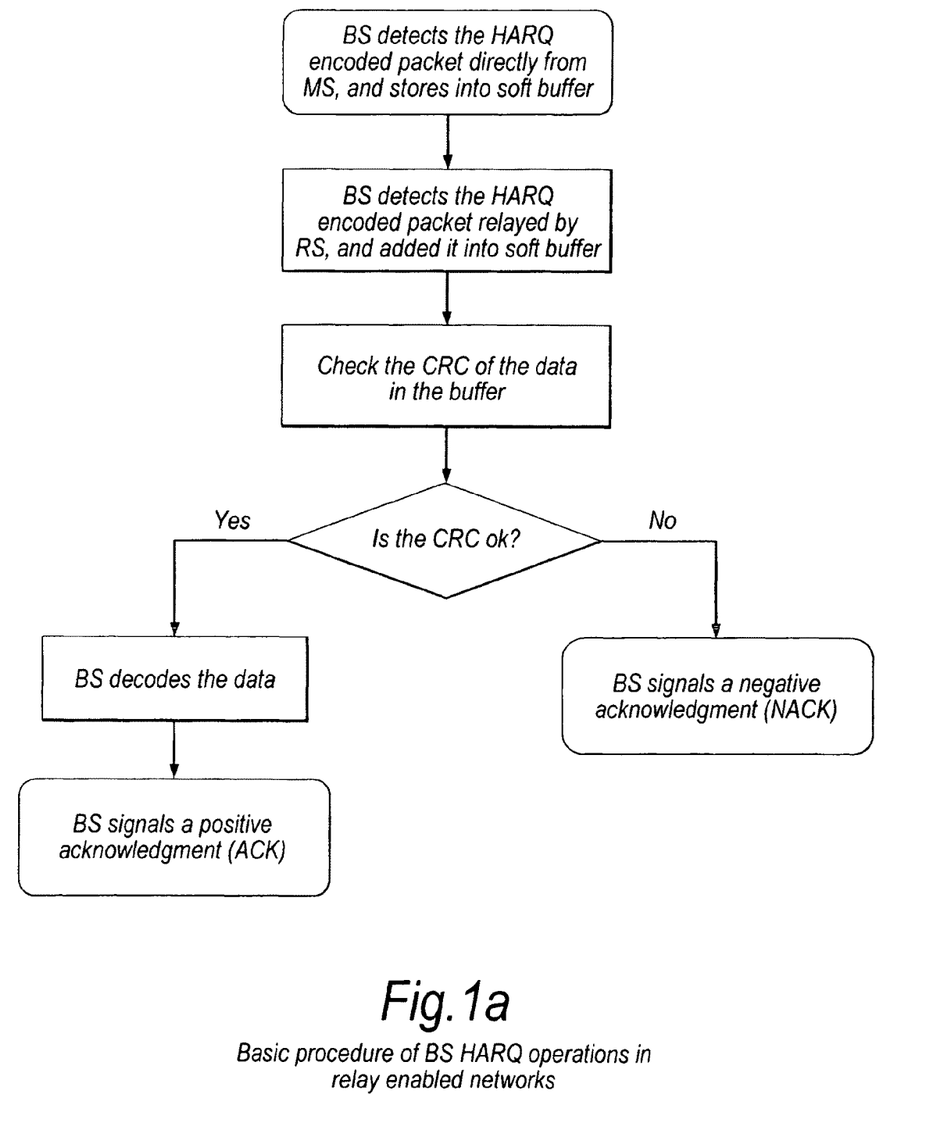
FIG. 1a shows basic procedure of BS HARQ-type operations in relay enabled networks.

In a transparent relaying system where control is centralised at the BS, the BS will have knowledge of when the MS will transmit to the RS as well as when the RS will relay the MS transmission to the BS. Thus it is assumed that the BS will exploit this knowledge and when using modified HARQ procedures will perform the following operations (as shown in FIG. 1a):

a. Detect the initial transmission from the MS and store the received HARQ encoded packet (or subpacket in case of an IEEE 802.16 system) in the soft buffer without attempting decoding;
b. Detect the relayed transmission(s) from the RS(s) and add the received relayed HARQ encoded packet (or subpacket in case of an IEEE 802.16 system) into the soft buffer;
c. Check the cyclic redundancy check (CRC) sequence of the data in the buffer and decode the data if the CRC is OK; and
d. Follow the standard procedure taken in the case of a single hop system after CRC checking (i.e. signal either a positive (ACK) or negative (NACK) acknowledgement message to the MS, retaining the contents of the soft buffer if it is a NACK).

CRC check and data decoding is not proposed after stage 1 because the direct transmission is likely to be of low reliability, and it is therefore better to wait for the relayed signal (which will arrive whether or not the direct transmission is successful) before performing decoding. As a result no extra decoding complexity is incurred through using the proposed mechanism in the invention embodiments.

It is also possible to extend this mechanism for the case of the BS requesting more than one RS to relay the MS transmission within a frame. In this case the BS combines all of the different versions of the HARQ packet that can be received prior to attempting decoding.

Advantageously, the different versions are both received within one frame (or more precisely for IEEE 802.16 systems, one uplink subframe) which is a discrete time period for uplink transmission only. For an indication of how transmission over at least two hops in a multihop system can be carried out in a single subframe, the reader is referred to GB 0616477.6, GB 0616481.8 and GB 0616479.2, all of which are incorporated by reference and copies of which are filed herewith.

In a similar manner to the UL data, ACK/NACK (i.e. when using HARQ on the DL) and other messages from the MS (direct and relayed via one or more RSs) could also be chase combined at BS, potentially improving ACK/NACK and other signalling detection reliability.

Figure 1B:
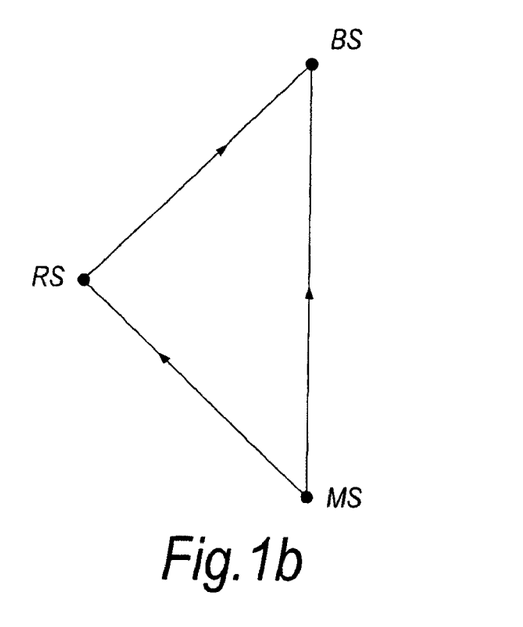
FIG. 1b shows a network configuration suitable for using the procedure.
Figure 1C:
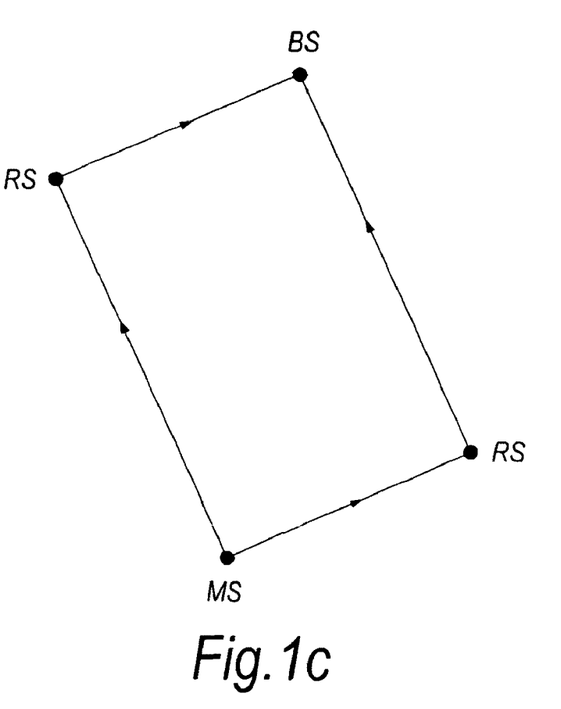
FIG. 1c shows an alternative configuration suitable for using the procedure.

FIGS. 1b and 1c demonstrate a type of network (or system) configuration used in embodiments of the present invention. Information is transmitted directly from a mobile station to a base station in FIG. 1b and, in the same uplink subframe, the information is transmitted indirectly from the mobile station to the base station via a relay station. The initial (first hop) transmission from the mobile station to the relay station and the direct transmission from the mobile station to the base station may be simultaneous or at different times, depending on the subframe format and/or type of information sent. The second hop transmission (from the relay station to the base station) follows the first hop transmission after the relay station turnaround. If the network does not support multihop transmission in a single subframe, the second hop transmission and any further hops could be in the subsequent uplink subframe(s). The stations are shown as a mobile station, relay station and base station. However, the particular links shown may be part of a longer communication path spanning further links so that either or both of the nodes shown as the base station and the mobile station may be relay stations.

FIG. 1c shows a network configuration in which the two alternative paths whose identical transmissions are combined are both relayed paths. Analogous considerations apply to those set out for FIG. 1b. The skilled person will appreciate the particular transmission timing factors involved. For example, the base station may receive the two second hop transmissions simultaneously using SDMA.

The two network configurations illustrated show two communication paths. It is also possible for transmissions from three or more separate paths to be combined.

It should be noted that the combining of information from the alternative paths can be supplemented with retransmission according to HARQ if an error is detected. The retransmission may be along one or more of the communication paths and is recombined with previously combined information.

Wherever information is combined (from different paths and/or retransmission), the information may be encoded using the same encoding version (as per normal chase combining) or using different encoding versions to give incremental redundancy. The reader is referred to the use of either method in IEEE Standard 802.16 for an exemplary implementation.

Benefits

In summary some of the benefits of invention embodiments are:

Provision of a simple mechanism that can be adopted at a BS in a relay enabled communication system that supports HARQ to improve reliability of HARQ packet reception in the case that both a direct and relayed signal or two relayed signals can be detected within the same frame (exploiting multihop diversity);

As a result MS/SS transmission power could be reduced or an MS/SS with an otherwise unreliable uplink connection can be supported;

Reduction in the number of retransmissions that an MS/SS has to make in the case of an unreliable link to achieve successful detection.

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality of a transmitter embodying the present invention. The invention may also be embodied as one or more device or apparatus programs (e.g. computer programs and computer program products) for carrying out part or all of any of the methods described herein. Such programs embodying the present invention may be stored on computer-readable media, or could, for example, be in the form of one or more signals. Such signals may be data signals downloadable from an Internet website, or provided on a carrier signal, or in any other form.

The invention claimed is:

1. An uplink transmission method for use in a multi-hop communication system, the system comprising a source apparatus, a destination apparatus and one or more intermediate apparatuses, and the system providing two or more different communication paths extending between said source apparatus and said destination apparatus, said source apparatus being configured to transmit information indirectly to the destination apparatus along a series of links forming a first such communication path via one or more of said intermediate apparatuses and also being configured to transmit information to said destination apparatus along one link or a series of links forming a second such communication path; and the intermediate apparatus or each said intermediate apparatus being configured to receive information from a previous apparatus along a path and to transmit the received information to a subsequent apparatus along a path; the method comprising transmitting particular information from the source apparatus along the first communication path via one or more of said intermediate apparatuses to the destination apparatus;

transmitting the same particular information from the source apparatus along the second communication path to the destination apparatus; and combining the same particular information transmitted along the first and second communication paths in the destination apparatus;

wherein, before said particular information is transmitted, it is encoded with Hybrid Automatic Repeat Request (HARQ) packet encoding, wherein the transmissions of the same information along both or all of the communication paths, as the case may be, are treated as transmission and re-transmission(s) according to HARQ.

2. The method according to claim 1, wherein the second communication path is a direct communication path and the same particular information is transmitted along the second path directly from said source apparatus to said destination apparatus.

3. The method according to claim 1, wherein the second communication path is an indirect communication path via one or more of said intermediate apparatuses and the same particular information is transmitted along the second path from said source apparatus to said destination apparatus via each of these intermediate apparatuses.

4. The method according to claim 1, wherein the system further provides a third such communication path, said source apparatus being configured to transmit the same particular information indirectly to the destination apparatus along a series of links forming the third communication path via one or more of said intermediate apparatuses, the method further comprising transmitting the same particular information from the source apparatus along the third communication path via each of these intermediate apparatuses to the destination apparatus;

combining the same particular information transmitted along the first, second and third communication paths in the destination apparatus; and checking the combined information from the first, second and third communication paths for errors.

5. The method according to claim 1, wherein the same particular information is transmitted along both or all, as the case may be, of the said communication paths to said destination apparatus in a discrete time period for uplink transmission only, which is followed by a discrete time period for downlink transmission only.

6. The method according to claim 1, further comprising, before transmission of said particular information, allocating transmission timing in the destination apparatus indicating when the said particular information is to be transmitted along the said communication paths.

7. The method according to claim 1 further comprising checking the combined information from the first and second communication paths for errors.

8. The method according to claim 7, further comprising transmitting an error indication if an error is found and/or transmitting a positive indication if no error is found.

9. The method according to claim 8, wherein the error indication includes a request for retransmission of the particular information.

10. The method according to claim 9, further comprising, if an error indication is transmitted, re-transmitting the particular information along one or more of said communication paths and combining the re-transmission with the previously combined information.

11. The method according to claim 7, further comprising adding an error detection sequence to said particular information before transmission and using the error detection sequence in the destination apparatus to check for errors in the combined information wherein the error detection sequence is preferably a Cyclic Redundancy Check (CRC).

12. The method according to claim 1, further including decoding the encoded information if no errors are detected.

13. The method according to claim 5, wherein the discrete time period for uplink transmission and the discrete time period for downlink transmission are an uplink sub-frame and a downlink sub-frame respectively in a time-division-duplex communication system.

14. The method according to claim 1, wherein said system is an Orthogonal Frequency Division Multiplexing (OFDM) or Orthogonal Frequency Division Multiple Access (OFDMA) system.

15. The method according to claim 1, wherein said source apparatus is a user terminal or a relay station; said destination apparatus is a base station, or a relay station; and the intermediate apparatus or each said intermediate apparatus is a relay station.

16. A multi-hop wireless communication system, the system comprising:

a source apparatus, a destination apparatus and one or more intermediate apparatuses, and the system providing two or more different uplink communication paths extending between said source apparatus and said destination apparatus, said source apparatus being configured to transmit information indirectly to the destination apparatus along a series of links forming a first such communication path via one or more of said intermediate apparatuses and also being configured to transmit information to said destination apparatus along one link or a series of links forming a second such communication path, and the intermediate apparatus or each said intermediate apparatus being configured to receive information from a previous apparatus along a path and to transmit the received information to a subsequent apparatus along a path;

transmission means configured to transmit particular information from the source apparatus along the first communication path via one or more of said intermediate apparatuses to the destination apparatus, and to transmit the same particular information from the source apparatus along the second communication path to the destination apparatus; and combination means configured to combine the same particular information transmitted along the first and second communication paths in the destination apparatus;

wherein, before said particular information is transmitted, it is encoded with Hybrid Automatic Repeat Request (HARQ) packet encoding, wherein the transmissions of the same information along both or all of the communication paths, as the case may be, are treated as transmission and re-transmission(s) according to HARQ.

17. A method in a destination apparatus of a multi-hop communication system, for improving reception reliability, the system comprising a source apparatus, the destination apparatus and one or more intermediate apparatuses, and the system providing two or more different uplink communication paths extending between said source apparatus and said destination apparatus, said source apparatus being configured to transmit information indirectly to the destination apparatus along a series of links forming a first such communication path via one or more of said intermediate apparatuses and also being configured to transmit information to said destination apparatus along one link or a series of links forming a second such communication path, and the intermediate apparatus or each said intermediate apparatus being configured to receive information from a previous apparatus along a path and to transmit the received information to a subsequent apparatus along a path; the method comprising     receiving particular information transmitted from the source apparatus along the first communication path via one or more of said intermediate apparatuses;

receiving the same particular information transmitted from the source apparatus along the second communication path; and     combining the same particular information transmitted along the first and second communication paths;

wherein, before said particular information is transmitted, it is encoded with Hybrid Automatic Repeat Request (HARQ) packet encoding, wherein the transmissions of the same information along both or all of the communication paths, as the case may be, are treated as transmission and re-transmission(s) according to HARQ.

18. A destination apparatus of a multi-hop communication system, the system comprising a source apparatus, the destination apparatus and one or more intermediate apparatuses, and the system providing two or more different uplink communication paths extending between said source apparatus and said destination apparatus, said source apparatus being configured to transmit information indirectly to the destination apparatus along a series of links forming a first such communication path via one or more of said intermediate apparatuses and also being configured to transmit information to said destination apparatus along one link or a series of links forming a second such communication path, and the intermediate apparatus or each said intermediate apparatus being configured to receive information from a previous apparatus along a path and to transmit the received information to a subsequent apparatus along a path; the destination apparatus comprising     receiving means configured to receive particular information transmitted from the source apparatus along the first communication path via one or more of said intermediate apparatuses to the destination apparatus, and to receive the same particular information transmitted from the source apparatus along the second communication path to the destination apparatus; and     combination means configured to combine the same particular information transmitted along the first and second communication paths in the destination apparatus;

wherein, before said particular information is transmitted, it is encoded with Hybrid Automatic Repeat Request (HARQ) packet encoding, wherein the transmissions of the same information along both or all of the communication paths, as the case may be, are treated as transmission and re-transmission(s) according to HARQ.

19. A non-transitory computer-readable medium storing at least one computer program which, when executed on computing devices of a multi-hop wireless communication system, cause the system to carry out an uplink transmission method, the system comprising a source apparatus, a destination apparatus and one or more intermediate apparatuses, and the system providing two or more different communication paths extending between said source apparatus and said destination apparatus, said source apparatus being configured to transmit information indirectly to the destination apparatus along a series of links forming a first such communication path via one or more of said intermediate apparatuses and also being configured to transmit information to said destination apparatus along one link or a series of links forming a second such communication path, and the intermediate apparatus or each said intermediate apparatus being configured to receive information from a previous apparatus along a path and to transmit the received information to a subsequent apparatus along a path; the method comprising     transmitting particular information from the source apparatus along the first communication path via one or more of said intermediate apparatuses to the destination apparatus;

transmitting the same particular information from the source apparatus along the second communication path to the destination apparatus;

combining the same particular information transmitted along the first and second communication paths in the destination apparatus;

wherein, before said particular information is transmitted, it is encoded with Hybrid Automatic Repeat Request (HARQ) packet encoding, wherein the transmissions of the same information along both or all of the communication paths, as the case may be, are treated as transmission and re-transmission(s) according to HARQ.

20. A non-transitory computer-readable medium storing a computer program which, when executed on a computing device of a destination apparatus in a communication system, causes the destination apparatus to carry out a method for improving reception reliability, the system comprising a source apparatus, the destination apparatus and one or more intermediate apparatuses, and the system providing two or more different uplink communication paths extending between said source apparatus and said destination apparatus, said source apparatus being configured to transmit information indirectly to the destination apparatus along a series of links forming a first such communication path via one or more of said intermediate apparatuses and also being configured to transmit information to said destination apparatus along one link or a series of links forming a second such communication path, and the intermediate apparatus or each said intermediate apparatus being configured to receive information from a previous apparatus along a path and to transmit the received information to a subsequent apparatus along a path; the method comprising:

receiving particular information transmitted from the source apparatus along the first communication path via one or more of said intermediate;

receiving the same particular information transmitted from the source apparatus along the second communication path; and     combining the same particular information transmitted along the first and second communication paths;

wherein, before said particular information is transmitted, it is encoded with Hybrid Automatic Repeat Request (HARQ) packet encoding, wherein the transmissions of the same information along both or all of the communication paths, as the case may be, are treated as transmission and re-transmission(s) according to HARQ.

* * * * *